US011101979B2

(12) United States Patent
Fletcher et al.

(10) Patent No.: US 11,101,979 B2
(45) Date of Patent: Aug. 24, 2021

(54) METHOD AND SYSTEM FOR CREATING WORD-LEVEL DIFFERENTIAL PRIVACY USING FEATURE HASHING TECHNIQUES

(71) Applicant: KIRA INC., Toronto (CA)

(72) Inventors: Samuel Peter Thomas Fletcher, Toronto (CA); Alexander Karl Hudek, Toronto (CA)

(73) Assignee: KIRA INC., Toronto (CA)

( * ) Notice: Subject to any disclaimer, the term of this patent is extended or adjusted under 35 U.S.C. 154(b) by 4 days.

(21) Appl. No.: 16/427,191

(22) Filed: May 30, 2019

(65) Prior Publication Data

US 2020/0382281 A1    Dec. 3, 2020

(51) Int. Cl.
*H04L 9/06* (2006.01)
*G06N 7/00* (2006.01)
*G06N 20/00* (2019.01)

(52) U.S. Cl.
CPC ........... *H04L 9/0643* (2013.01); *G06N 7/005* (2013.01); *G06N 20/00* (2019.01); *H04L 9/0618* (2013.01)

(58) Field of Classification Search
CPC . H04L 9/0643; H04L 9/0618; H04L 2209/42; H04L 9/3239; G06N 7/005; G06N 20/00
See application file for complete search history.

(56) References Cited

U.S. PATENT DOCUMENTS

| 8,204,945 | B2 | 6/2012 | Milliken et al. |
| 10,176,305 | B2 | 1/2019 | Sitrick et al. |
| 2005/0033728 | A1* | 2/2005 | James .................. G06F 8/60 |
| 2009/0132669 | A1* | 5/2009 | Milliken ............ G06F 21/562 |
| | | | 709/206 |
| 2019/0095805 | A1 | 3/2019 | Tristan et al. |

FOREIGN PATENT DOCUMENTS

| JP | 2004527188 A | 9/2004 |
| JP | 4336078 B2 | 9/2009 |
| JP | 5930235 B2 | 6/2016 |

OTHER PUBLICATIONS

John Moody, "Fast Learning in Multi-Resolution Hierarchies", Advances in Neural Information Processing Systems, 1989, pp. 29-39.

(Continued)

*Primary Examiner* — Abiy Getachew
(74) *Attorney, Agent, or Firm* — Elan IP Inc.

(57) ABSTRACT

The present invention discloses a method of creating word-level differential privacy with the hashing trick to protect confidentiality of a textual data, the method comprising: receiving a list of a plurality of hashes with a weight (or weights) associated with each of the plurality of hashes; Updating said list with new hashes that are within the range of allowable hash values but not included in said received list of hashes; Updating said list with a new weight to each of said plurality of hashes that are missing said weight; Fitting a probability distribution to said list of said weights of said plurality of hashes; and generating said new weights and said adjusted weights based on sampling of said probability distribution.

9 Claims, 3 Drawing Sheets

(56) References Cited

OTHER PUBLICATIONS

Sanchez et al., "Detecting Sensitive Information From Textual Documents: An Information-Theoretic Approach", International Conference on Modeling Decisions for Artificial Intelligence, 2012, pp. 173-184, Modeling Decisions for Artificial Intelligence.

Cynthia Dwork, "Differential Privacy: A Survey of Results", International Conference on Theory and Applications of Models of Computation, 2008, pp. 1-19, Theory and Applications of Models of Computation.

Weinberger et al., "Feature Hashing for Large Scale Multitask Learning", ICML '09 Proceedings of the 26th Annual International Conference on Machine Learning, 2009, pp. 1113-1120.

Cumby et al., "A Machine Learning Based System for Semi-Automatically Redacting Documents", Proceedings of the Twenty-Third Innovative Applications of Artificial Intelligence Conference, 2011, pp. 1628-1635.

* cited by examiner

US 11,101,979 B2

METHOD AND SYSTEM FOR CREATING WORD-LEVEL DIFFERENTIAL PRIVACY USING FEATURE HASHING TECHNIQUES

(1) FIELD OF THE INVENTION

The present invention generally relates to the field of document privacy. The invention particularly relates to a method for creating word-level differential privacy with the hashing trick.

(2) BACKGROUND OF THE INVENTION

When reading large amounts of text for document classification and other Information Retrieval (IR) or Machine Learning (ML) tasks, training data often may not contain all possible words that might be seen in the future. When new words are encountered, machines need to know how to handle them. Recently, one solution to this problem has been proposed that is commonly referred to as the "hashing trick". In short, the hashing trick is a technique used to encode categorical features. Specifically, the hashing trick handles this problem by hashing all words that are encountered into a known, predefined hash range. This hash range acts as the maximum dictionary size; no matter how many unique words are encountered, they are all deterministically mapped to a hash value. These hashes are used as the features for training, and as the features when observing new data.

One application of hashing has been to protect confidential information in documents. If documents being observed contain sensitive information, a confidentiality preservation technique may be required before the documents can be safely used for IR and ML tasks. Hence, redaction may be the only viable technique currently used to maintain the confidentiality of words or documents. While some work has been done on automatic redaction, semiautomatic redaction, and human-assistance tools, there may often be a high cost associated with failing to redact something sensitive (i.e. a false negative), making automatic redaction difficult to trust.

A number of different types of tools and methods creating word-level confidentiality of a textual data are available in the prior art. For example, the following patents are provided for their supportive teachings and are all incorporated by reference:

Prior art document, U.S. Pat. No. 8,204,945B2 discloses a system which may detect transmission of potentially unwanted e-mail messages. The system may receive e-mail messages and generate hash values based on one or more portions of the e-mail messages. The system may then determine whether the generated hash values match hash values associated with prior e-mail messages. The system may determine that one of the e-mail messages is a potentially unwanted e-mail message when one or more of the generated hash values associated with the e-mail message match one or more of the hash values associated with the prior e-mail messages.

Another prior art document, JP2004527188A discloses a security device for protecting messages being shipped to the receiving device having means for controlling the identification by varying the current key and process on. The invention also relates to a corresponding device and the corresponding process for identifying messages. The security device, using a variable current cryptographic key has a unit that controls the encryption for at least a portion of these messages each time, signature to be added to the message It is generated. The key receiving unit by an identifier current identification key, so that the current identification key and the current encryption key coincide with each other, made of the available plurality of identification keys in advance will be able to choose from a set that has been decided. Furthermore the above message is a service announcement message.

Yet another prior art document, U.S. Ser. No. 10/176,305B2 discloses data rights management and more particularly to a secured system and methodology and production system and methodology related thereto and to apparatus and methodology for production side systems and are consumer side systems for securely utilizing protected electronic data files of content (protected content), and further relates to controlled distribution, and regulating usage of the respective content on a recipient device (computing system) to be limited strictly to defined permitted uses, in accordance with usage rights (associated with the respective content to control usage of that respective content), on specifically restricted to a specific one particular recipient device (for a plurality of specific particular recipient devices), or usage on some or any authorized recipient device without restriction to any one in specific, to control use of the respective content as an application software program, exporting, modifying, executing as an application program, viewing, and/or printing of electronic data files.

Yet another prior art document, JP5930235B2 discloses a method of digital encryption. More specifically, for the protection of the operation of the cryptographic hash function in the white-box attack environment. Hash Functions and other cryptographic primitives (e.g., block cipher) an important difference between the hash function is that it does not have the key (that is, the hash function is a keyless primitive). This means that if given the message, anyone can calculate its digest. A step processor of the computer, in order to provide an encoded input message, encodes the input message, at least temporarily storing the memory. Processor of the computer, to provide a padded message, using one or more padding bytes, including the padding bytes that are one or more encoded, the encoded input message encryption padded until message length defined by a hash function, a step of at least temporarily storing the memory.

Yet another prior art document, US20190095805A1 discloses a method to build and execute a decision system based on multiple machine learned decision models. In embodiments, the decision system performs a hashing technique to reduce relevant features of the input data into a feature vector for each decision model. The feature vector reduces the dimensionality of the feature universe of the input data, and its use allows the decision models to be trained and executed using less computing resources. In embodiments, the decision system implements an ensembled decision model that makes decisions based on a combination function that combines the decision results of the individual models in the ensemble. The decision models employ different hashing techniques to hash the input features differently, so that errors caused by the feature hashing of individual models are reduced in the aggregate.

Yet another prior art document, JP4336078B2 discloses an electronic document protection method, Encrypting the electronic document using the document encryption key, comprising at least one multi-key component, and generating a multi-key encryption table for use in the multi-key encryption method, and generating an encrypted header comprising information relating to the electronic document, wherein the user interface device encrypted header, the multi-key encryption table, and the method comprising the steps of associating the encrypted electronic document, wherein the user interface device, non-encrypted for identifying the electronic document information, the method comprising including a dialogue element users to be able to enter a user authorization for access to at least part of the encrypted document, The above mentioned references and the prior art in general have one or more of the following shortcomings: (a) Less secure data; (b) Possibility of guessing words that correspond to the hash values by an attacker (c) The attacker may have template of a hashing document (d) Unable to encrypt the textual data (e) Less accuracy and (f) Disruption of operations.

The present application addresses one or more of the above mentioned concerns and shortcomings with regard to providing a method of creating word-level differential privacy with the hashing trick to protect confidentiality of a textual data.

(3) SUMMARY OF THE INVENTION

In the view of the foregoing disadvantages inherent in the known types of the method of creating word-level confidentiality with the hashing trick now present in the prior art, the present invention provides an improved method for creating word-level differential privacy with the hashing trick to protect confidentiality of a textual data. As such, the general purpose of the present invention, which will be described subsequently in greater detail, is to provide a new method for creating word-level differential privacy to protect confidentiality of textual data.

An object of the invention is to provide a method of creating word-level differential privacy with the hashing trick to protect confidentiality of a textual data, the method comprising: receiving a list of a plurality of hashes with a weight (or weights) associated with each of the plurality of hashes; updating said list with new hashes that are within the range of allowable hash values but not included in said received list of hashes; updating said list with a new weight to each of said plurality of hashes that are missing said weight; in cases where said received list of hashes is a newer version of a previously-existing list of hashes, updating said list with adjusted weights with respect to said hashes' weights in said previously-existing list of hashes; fitting a probability distribution to said list of said weights of said plurality of hashes; and generating said new weights and said adjusted weights based on sampling of said probability distribution.

Yet it is another object of the invention that the probability distribution may be continuous when said weight of said plurality of hashes are continuous, and said probability distribution may be a discrete value when said weight of said plurality of hashes may be the discrete values Yet it is another object of the invention is that the probability distribution may be multi-dimensional when the number of said weights associated with each hash is more than one. The probability distribution may be 2d dimensional when each of the d weight types have both a previously-existing value and an adjustment value, with said adjustment value calculated as the difference between said previously-existing value and the value in said received list of hashes with associated weights.

It is another object of the invention is to provide a non-transitory computer-readable medium storing computer-executable instructions for carrying out the method as herein described.

Yet it is another object of the invention is to provide the non-transitory computer-readable medium, wherein said probability distribution is continuous when said weight of said plurality of hashes are continuous, and wherein said probability distribution is discrete value when said weight of said plurality of hashes are discrete values.

Yet it is another object of the invention is to provide the non-transitory computer-readable medium, wherein said probability distribution is multi-dimensional when type of said weight is more than one.

Yet it is another object of the invention is to provide the non-transitory computer-readable medium, wherein said probability distribution is 2d dimensional when type of said weight is d dimensional and previously-existing weights are being adjusted.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

The invention will be better understood and objects other than those set forth above will become apparent when consideration is given to the following detailed description thereof. Such description makes reference to the annexed drawings wherein.

(5) DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the scope of the present invention, which is defined solely by the claims that follow the detailed description.

References will now be made in detail to the exemplary embodiment of the present disclosure.

Figure 1:
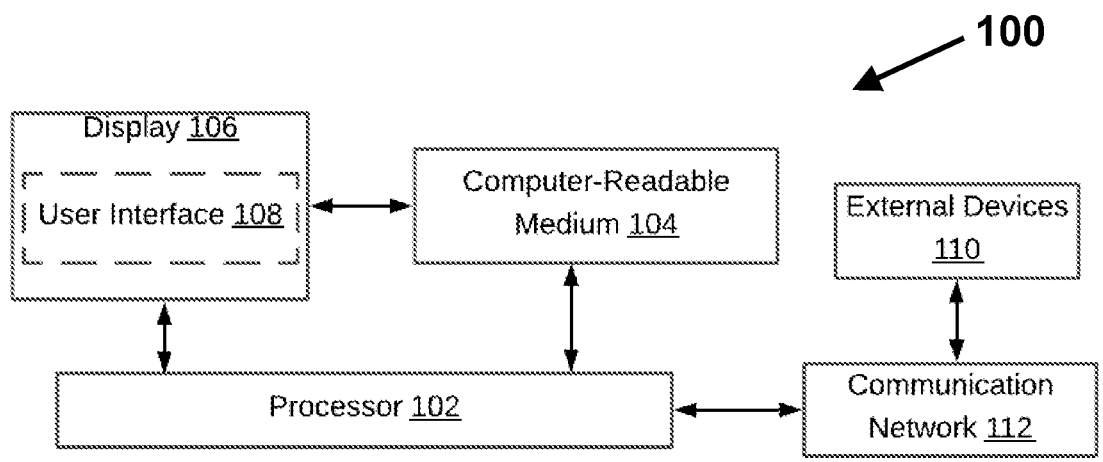
FIG. 1 depicts a block diagram of an exemplary system for creating word-level differential privacy with the hashing trick to protect confidentiality of a textual data according to one of the embodiments of the present invention.

FIG. 1 depicts a block diagram of an exemplary system for creating word-level differential privacy with feature hashing, such as a hashing trick, to protect confidentiality of a textual data according to one of the embodiments of the present invention. The hashing trick is a method that is used to make machine learning algorithms faster and use less memory. The hashing trick works by mapping the set of features in the input data into another set by using a hash function. The hashing thus reduces the size of the feature set. In addition, the hashing fixes the number of features that are provided to the decision model, for any input data. Those skilled in the art would understand, however, that the hashing trick is simply one example of a hashing technique that may be used to reduce the dimensionality of the input data. In other embodiments, other hashing techniques may be used.

The system 100 may implement in a differential privacy creating device, in accordance with some embodiments of the present disclosure. The differential privacy creating device, may create word-level differential privacy with the hashing trick to protect confidentiality of textual data. In particular, the system 100 may include a differential privacy creating device (for example, server, desktop, laptop, notebook, netbook, tablet, smartphone, mobile phone, or any other computing device having a processor) that may create word-level differential privacy.

As will be described in greater detail in conjunction with FIGS. 2-3, the differential privacy creating device receive a list of a plurality of hashes with a weight (or weights) associated with each of the plurality of hashes. It should be noted that at least one hash of the plurality of hashes is associated with a missing weight. Further, the differential privacy creating device may update said list with new hashes that are within the range of allowable hash values but not included in said received list of hashes. Moreover, the differential privacy creating device may update said list with a new weight to each of said plurality of hashes that are missing said weight. It should be noted that, in cases where said received list of hashes is a newer version of a previously-existing list of hashes, updating said list with adjusted weights with respect to said hashes weights in said previously-existing list of hashes. The differential privacy creating device may then fit a probability distribution to said list of said weights of said plurality of hashes. The differential privacy creating device may then generate said new weights and said adjusted weights based on sampling of said probability distribution.

The system 100 may include one or more processors 101, a computer-readable medium (for example, a memory) 102, and a display 103. The computer-readable storage medium 102 may store instructions that, when executed by the one or more processors 101, cause the one or more processors 101 to validate the document, in accordance with aspects of the present disclosure. The computer-readable storage medium 102 may also store various data that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
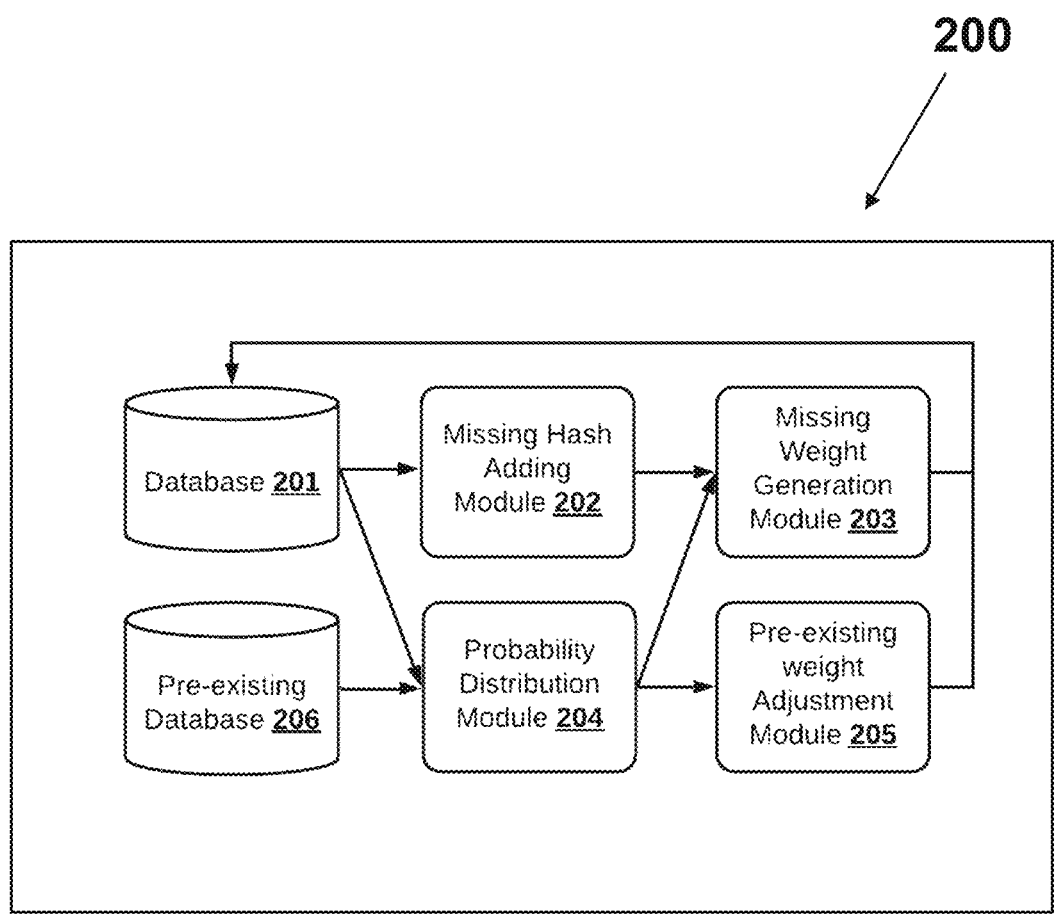
FIG. 2 depicts an internal architecture model for creating word-level differential privacy with the hashing trick to protect confidentiality of a textual data according to one of the embodiments of the present invention.

FIG. 2 depicts an internal architecture model 200 for creating word-level differential privacy with the hashing trick to protect confidentiality of a textual data according to one of the embodiments of the present invention. The internal architecture model 200 may protect the confidentiality of all the words in a corpus of the textual data, so that a malicious user cannot reverse-engineer or guess words that match the hashes. The internal architecture may fill in all the remaining hashes, so that the final list of the plurality of hashes may contain every number in the fixed range (for example—every number between 0 and 2,000,000). Further, the internal architecture may generate fake weights for each of the plurality of hashes so that, the plurality of hashes may be indistinguishable from the weights of the genuine hashes. Hence, the end result may be that the malicious user may not guess or determine which hashes may be genuine and which hashes may be fake.

The database 201 may store a list of a plurality of hashes and a weight associated with each of the plurality of hashes. The internal architecture model 200 may build a hashing algorithm that reads a corpus of textual data and may convert each words into hash. The same word will always be converted to the same hash. But, it may be a possibility that multiple words may correspond with the same hash. In this case, the internal architecture model 200 may share that hash, and from that point on the computer algorithm may treat the multiple words as identical. During training, various weights (for example—parameters, values) may be assigned to the hashes, based on how useful the internal architecture may find each of the plurality of hashes to be when building a model.

Further, the missing hash adding module 202 may add the plurality of hashes with missing hash in the list of the plurality of hashes. Hence, for each hash with missing weight inside the maximum hash range which may not appear in the list of the plurality of hashes, the hash adding module 202 may add to the list. Further, for each new hash added, the hash adding module may generate a set of weights for it by sampling from the probability distribution and when the distribution includes dimensions for the update differences, the hash adding module 202 may ignore them.

Further, for each pre-existing hash with missing weights, missing weight generation module 203 may generate values for the missing weights that may be correlated with the pre-existing weights. Moreover, for each of the weight of hashes that may not be updated, the pre-existing hash updating module 205 may generate an update that may be correlated with the pre-existing weights and any pre-existing updates, and add it to the weight.

Further, a probability distribution module 204 may perform the probability distribution to the weights of the updated plurality of hashes. It should be noted that when there may be more than one type of weight then the probability distribution may be multi-dimensional. By way of an example, when there may be d types of weight then the probability distribution may be of 2d dimensional. Moreover, when the weights of the plurality of hashes may be continuous number then the probability distribution may be continuous and when the weights of the plurality of hashes may be discrete values then the probability distribution may be discrete values. The module 204 is in communication and extracts information from the pre-existing database 206.

Additionally, when the distribution of weights may be shaped like a known distribution such as the Normal (Gaussian) Distribution or Laplace Distribution, then the shape can be described with a small number of parameters and a parametric technique can be used. When the distribution of weights may have an unusual shape that can't be easily described with a few parameters, a non-parametric technique needs to be used, such as Kernel Density Estimation. It should be noted that how the distribution may be fitted, may not affect the overall process, but it may affect how good the confidentiality guarantee may be, and how well the model may perform.

Figure 3:
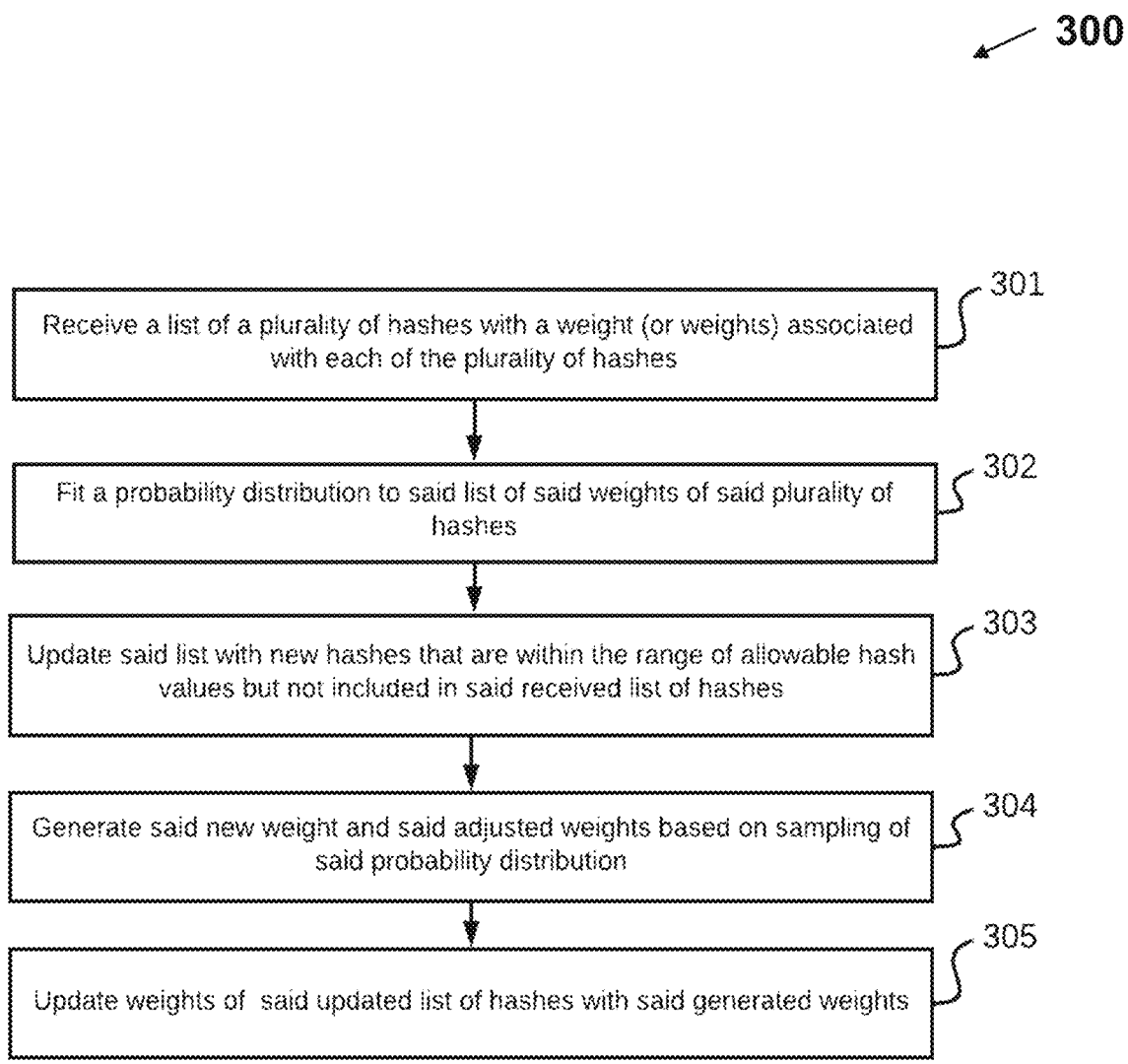
FIG. 3 depicts a method for creating word-level differential privacy with the hashing trick to protect confidentiality of a textual data according to one of the embodiments of the present invention.

FIG. 3 depicts a method for creating word-level differential privacy with the hashing trick to protect confidentiality of a textual data according to one of the embodiments of the present invention. At step 301, the control logic 300 may receive a list of a plurality of hashes with a weight (or weights) associated with each of the plurality of hashes. It should be noted that at least one hash of the plurality of hashes may be associated with a missing weight. Further at step 302, the control logic 300 may update said list with new hashes that are within the range of allowable hash values but not included in said received list of hashes. Further at step 303, the control logic 300 may update said list with a new weight to each of said plurality of hashes that are missing said weight. It should be noted that, in cases where said received list of hashes is a newer version of a previously-existing list of hashes, updating said list with adjusted weights with respect to said hashes weights in said previously-existing list of hashes. Further, at step 304, the control logic 300 may fit a probability distribution to said list of said weights of said plurality of hashes. Further, at step 305, the control logic 300 may generate said new weights and said adjusted weights based on sampling of said probability distribution.

A hashing trick may also be known as feature hashing, the hashing trick involves using a hash function to assign indices to features. It differs from traditional hashing in that that instead of using each hash as a key mapped to some value, the "trick" is that the hash itself is the value. This has two main advantages: it is computationally fast and space-efficient; and it maps a potentially infinite number of features into a known, bounded hash range.

The hashing function is deterministic; a feature (which may just be a word in scenario of the present invention) will always be hashed to the same value h. Hashes cannot easily be reverse-engineered back to the original text string though—the hashing process involves overwriting and shifting the bit string so many times, that reversing the process leads to many trillions of possible original text strings.

It is possible for multiple words to "collide" to the same hash number. In these cases, all occurrences of the colliding words or features will be mapped to the same hash, and share the same weight(s) θ. The hashing process is often random enough to be considered uniform sampling with replacement.

When using the hashing trick, the universe of possible outputs U is finite, and known. For a particular problem, the output distribution H will only use a subset of the universe, H⊆U, from which the training data x and testing data z are then drawn from. For an adequately large x and z, one can expect minimal covariate shift; the hash set outputted by a hashing function g(x) is assumed to be close to the hash set outputted by g(z):

$$g(x), g(z) \xrightarrow[|x|,|z| \to \infty]{} H$$

Based on empirical experiments, this sampling assumption holds true in practice.

Moreover, differential privacy is a tractable, mathematically-rigorous definition of privacy, where a data holder makes the following promise to each user—"You will not be affected, adversely or otherwise, by allowing your data to be used in any study or analysis, no matter what other studies, data sets, or information sources, are available."

It has since been adopted as the de facto privacy standard by companies like Apple and Google, and has been applied to numerous ML algorithms. While other privacy definitions such as k-anonymity and l-diversity exist, they do not protect against auxiliary information, or offer any provable guarantees. For purposes, one can think of each "user" as being a unique word, and define differential privacy as follows:

Expressed mathematically in example 1, an algorithm $f(\cdot) \to M$ may be $(\epsilon, \delta)$-differentially private if for all possible outputs in the universe $M \subseteq U$, for all possible adjacent corpora x and x' that differ only by all occurrences of one word:

$$\Pr(f(x)=M) \le e^{\epsilon} \times \Pr(f(x'')=M) + \delta \qquad (1)$$

where $\epsilon$ may measure the maximum multiplicative change in output probabilities, and $\delta$ measures the maximum additive change (often thought of as the failure rate of the privacy guarantee).

For example, for a common value such as $\epsilon \approx 0.1$, the probability of any particular output should not change by more than 10% when a word in x may be added or removed (note that example 1 may be symmetrical for x, x'). Basically, the removal or addition of a data point should only have a small chance of affecting a function's output.

User-Level Privacy: Traditionally, differential privacy compares two "neighboring" data sets x and x' that differ by a single data point, such that $|x|-|x'|=1$. This treats each data point independently. User-level privacy is a variation that takes into account that the same "user" may appear in x multiple times, and that one can want to totally hide the presence of the user, rather than just one of their data points. Two data sets are the to be "adjacent" to one another if they differ by all occurrences of a single user, such that $|x|-|x'|=k$, $k \ge 1$.

This definition of adjacency matches the scenario of the present invention, in which one can hide the presence or absence of all occurrences of each word. Since the concept of a "user" is an ill fit for application, instead one can call it word-level privacy.

Composition: If a hashing function g maps words to hashes rather than features to hashes, then for any adjacent corpora x and x', $g(x) \to H$ and $g(x') \to H'$ will be neighboring hash sets. That is, while $|x|-|x'|=k$ for $k \ge 1$, one can know that $|H|-|H'|=1$ if g performs word hashing. If g instead performs feature hashing, then $|H|-|H'|=n$ for some $n \ge 1$. In this scenario, the privacy cost of hiding all occurrences of a word is the composition of the privacy cost of hiding the n corresponding hashes. Fortunately, differential privacy is well-equipped to handle composition.

By way of an example 2, Let $f_i(x)$ be $(\epsilon_i, \delta_i)$-differentially private. Then $f_i=1 \ldots n=(f_1(x), \ldots, f_n(x))$ may be $$(\Sigma_i^n \epsilon_i, \Sigma_i^n \delta_i)$$

which may be differentially private.

In order to preserve the confidentiality of each word when the words themselves may be the features, one can need to design quite a unique differentially private solution. Unlike most differential privacy techniques, there is no aggregation one can employ when it comes to the hash set—all hashes are equally "distant" from each other, and adding "noise" to a hash equates to entirely destroying it. The solution needs to account for the fact that if the attacker has hashing function, they can guess words to hash and look for them in the hash set. Solution provided in the present invention needs to release a hash set containing legitimate hashes, while simultaneously not allowing an attacker to detect which hashes are legitimate.

For any word that an attacker does not already know is in x, there are three ways that an attacker might be able to infer its presence or absence: a) by observing the presence or absence of a hash h∈H that the attacker knows maps to the target word, and that is unlikely to appear by chance; b) by observing parameters $\theta_h$ paired with a new hash that are unlikely to have naturally occurred; and c) by observing parameters $\theta_h$ paired with an already known hash that do not match the parameters the attacker expected to see (likely meaning that a collision occurred).

Note that goal is only to protect the words; the goal is not to prevent an attacker from learning parameter values in Θ. One can assume that in the worst-case scenario, an attacker possesses: the entire corpus x except for one word; the hashing algorithm g; the training algorithm f; and that therefore they can potentially rebuild M in its entirety, minus the ix hash-parameter pairs related to the one word. As far as word-level confidentiality is concerned, the 0 values paired with a hash h only affect confidentiality insofar as they reveal something about the legitimacy of h. One can use output perturbation to provide confidentiality; the anonymization process is performed after M is outputted by f(x), but before it is publicly released. One can refer to the anonymization of H as *(H)→H*, and the modification of Θ as *(Θ)→Θ*. The final anonymized output is then M*={(h*, $\theta^*_h$); ∀h∈H*}. Only M* is ever publicly released.

In the present invention, first presenting the strategy for *(H) and *(Θ) and prove that these parts are (0, 0)-differentially private and (∈, δ)-differentially private respectively.

Anonymizing H: Considering all possible hash values 1, . . . , R, one can note the hashes that do not appear in H. The function *(H) fills in these remaining hashes to produce H*, so that |H*|=R. The resulting hash set H* is (∈, δ)-differentially private, with ∈=0, δ=0.

Proof: Observing that H is the output of g(x), one can consider two adjacent corpora x and x' as in example 1. Function *(H) always outputs H*, no matter what x is. Thus Pr(*(g(x))=H*)=100% for all possible x. Then, using equation 1, one can have Pr(*(g(x))=H*)=Pr(*(g(x'))=H*)

Pr(*(g(x))=H*)≤$e^∈$×Pr(*(g(x'))=H*)+δ

$e^∈$=1,δ=0

∈=0,δ=0

Not only does *(H) hide which hashes were originally in H, but it also hides the original size of H. This in turn hides the collision rate of hashes in H. There is no way for the attacker to learn how many words in x were likely mapped to the same hash by only observing H*.

Anonymizing Θ is about ensuring each h*∈H* has a full set of plausible parameters $\theta^*_h$. This includes filling any gaps in θ in preexisting hashes h∈H: a worst-case attacker will know which parameters each h should legitimately have, and which parameters they should have missing (if any). For each of the synthetic hashes h* (i.e., the hashes that are not in H), the function *(Θ) generates values for the d elements in θ. One can treat Θ as a d-dimensional continuous space, where d=max(|θ|; ∀θ∈M). For preexisting hashes h, *(Θ) generates values for any missing elements in θ that are correlated with the preexisting values.

One way to match the distribution would be to simply sample from the pre-existing θ values, however this would unnecessarily expose the set of possible θ's and their frequencies. If an attacker expected to see all of the θ's except one, then they immediately learn that one of the hashes with the new θ is legitimate. If there is only one such hash, confidentiality is breached. In other words, one can want the statistical difference between Θ* and Θ to be close, but not so close that any single θ∈Θ has the potential to noticeably change Θ*

To generate appropriate values, *(Θ) first fits a nonparametric joint probability density function (PDF) to Θ̂⊆Θ, where Θ̂ contains only θ's with no missing elements. *(Θ) can use Kernel Density Estimation (KDE) to perform the fit. The dimensionality of the joint PDF is d. New values can then be sampled from this PDF; either full θ's to be randomly assigned to the each H*, or the missing values of preexisting θ's that are correlated to the preexisting values.

The question then becomes, how different is the final distribution Θ* from all possible initial neighboring distributions Θ̂'?(∈, δ)-indistinguishability provides us a way to measure the statistical distance between the two distributions in a way that cleanly translates to differential privacy:

By way of an example 3, two probability distributions p and q on the same space are called (∈, δ)-indistinguishable if:

Pr(KL(p∥q)≤∈)≥1−δ,

Pr(KL(q∥p)≤∈)≥1−δ, where KL (.∥.) is the Kullback-Leibler divergence:

$$KL(p\|q) = \int_{-\infty}^{\infty} p(X)\log\left(\frac{p(X)}{q(X)}\right)dX$$

If p=D(x) and q=D(x') are (∈, δ)-indistinguishable for all neighboring x, x', then D is (∈, δ)-differentially private.

Anonymizing Θ: Using the process described above, the output Θ* of the function *(Θ) is (∈, δ)-differentially private, where ∈=max(KL(D(Θ̂)∥D(Θ̂')),
   KL(D(Θ̂')∥D(Θ̂))); ∀x's.t.|Θ̂⊆−Θ̂'|=1

δ=Pr(g($x_i$)=g($x_j$)); ∀$x_i$ not equal to $x_j$; and where $x_i$ and $x_j$ are different words in the corpus.

Proof: The calculation of ∈ is a direct application of Definition 3. However since preexisting θ values are not perturbed, there is a risk of an attacker learning about a collision if a preexisting θ does not have the values that would have been outputted by f(g(x)) if there had not been a collision. δ captures this risk of a hash collision.

If the number of collisions C has been tracked by the data holder, δ=C/R. Otherwise if g is a sufficiently random hashing function that uniformly randomly outputs hashes, E[C] can be calculated by subtracting |H| from the total number of features T, where T can be found by solving:

R×(1−((R−1)/R)$^T$=|H|

For example if the number of hashes is |H|=106 and the hash range is R=232, then one can expect there were C=120 collisions, for a collision rate (and therefore δ) of 0.00012.

If one wished to avoid δ>0 and instead increase ∈, this could be achieved by adding noise to each of the genuine hashes' parameters. However because hashes are connected to individual words (as opposed to being aggregated linear queries or some other smoothed output), the amount of noise that would need to be added to each hash's parameters to hide collisions is prohibitively large.

In the present invention, it is easy to apply it in real-world scenarios will require care to ensure an acceptable $\in$ and $\delta$ is achieved. If KDE is used to fit $\Theta^{\wedge}$'s distribution, the bandwidth parameter can be adjusted to raise or lower $\in$ (with corresponding increases and decreases in model performance). One can also reduce $\delta$ by resampling some number of genuine hashes with new values from $\Theta^{\wedge}$'s PDF, effectively making them synthetic:

Reducing $\delta$: The probability of finding a genuine collision, $Pr(g(x_i)=g(x_j))$; $\forall x_i$ not equal to $x_j$, can be diluted by resampling $\theta$ for s genuine hashes in x, reducing $\delta$ by a factor of s such that anonymizing of $\Theta$ becomes ($\in$, $\delta/s$)-differentially private.

Composition: Using composition from example 2, one can trivially see that the combination of anonymizing H and $\Theta$ composes to become $(0+\in, 0+\delta)$-differentially private. This encapsulates the scenario where each word maps to a single hash. If the hashes instead represent features, and words can be part of multiple features, one can account for this with additional applications of example 2:

Accounting for n: If a single occurrence of a word is part of features that map to $n \geq 1$ hashes, then anonymizing H remains (0, 0)-differentially private and anonymizing $\Theta$ becomes $(n\in, n\delta)$-differentially private, where $\in$ and $\delta$ are defined by anonymizing $\Theta$. One can then need to account for adjacent data sets, where removing all instances of a word results in $|x|-|x'|=k$:

Accounting for k: If each occurrence of a word maps to $n \geq 1$ hashes, and a word appears $k \geq 1$ times in x, then anonymizing H remains (0, 0)-differentially private and anonymizing $\Theta$ becomes $(\eta\kappa\in, \eta\kappa\delta)$-differentially private, where $\in$ and $\delta$ are defined by anonymizing $\Theta$.

Note that multiplying $\in$ and $\delta$ by $\eta\kappa$ is the theoretical upper bound, where each occurrence of a word results in a unique set of features, with no overlap or repetition. In settings where the data holder can observe the maximum number of features generated by all occurrences of each word, $\eta\kappa$ can likely be reduced.

Additionally, $\eta\kappa\delta$ is measuring the probability of at least one collision, while in reality if only one feature out of many collided, the attacker's confidence that the colliding feature belongs to a specific word, and not a different word, is essentially $1/\eta\kappa$. Multiple collisions would need to match the features of a particular word before the attacker's confidence would grow.

When calculating $\in$, accounting for n and accounting for k may be considering two neighboring distributions $\Theta^{\wedge}$ and $\Theta^{\wedge\prime}$ and then composing the privacy loss for distances larger than one. For $\in$, one can also measure the privacy loss using adjacency, where one can measure the maximum KL-divergence between two distributions differing by $\eta\kappa$ data points:

Using adjacency: When measuring the maximum KL-divergence for anonymizing $\Theta$, $\in$ is measured using neighboring distributions, $|\Theta^{\wedge}|-|\Theta^{\wedge\prime}|=1$. One can instead consider two adjacent distributions $|\Theta^{\wedge}|-|\Theta^{\wedge\prime}|=\eta\kappa$:

$$\in' = \max(KL(D(\hat{\Theta})\|D(\hat{\Theta}')), KL(D(\hat{\Theta}')\|D(\hat{\Theta}))); \forall x\text{'s.t.}|\hat{\Theta}|-|\hat{\Theta}'|=nk$$

This may result in a tighter bound on the privacy loss, if $\in' < \eta\kappa\in$ If the number of features a word can appear in is proportional to how frequently the word appears in the corpus, one can consider each word's frequency separately when assessing its level of confidentiality. Each word can be considered to have its own k, with rarer words being more heavily protected.

Model Performance: Recall from Observation 1: For any particular scenario being modelled, the output distribution H will only use a subset of the universe, $H \subseteq U$, from which the training data and future data are both then drawn from.

The (h, $\theta$) tuples in M are untouched by *(H). Only tuples that do not appear in the training data are affected, which by definition are outside of H. When the same h's are seen again in future data, they are correctly assigned the unperturbed values contained in $\theta$. The rarity of observing new hashes outside the training distribution means that the addition of the fake hashes h* does not overly distort M's predictions.

Note that this sampling assumption weakens as the training size decreases; a small x" may not have converged to E[x] as well as a larger x" would have. This also holds true when considering the size of batches in online learning.

Online Learning: In the online learning setting, a model $M_b$ is updated with a new batch of documents $x_{b+1}$. This can be repeated any number of times; the model is a "living" model, adapting to new data as it becomes available. So far one can have only considered a single model $M_0$ being trained on $x_0$. For b>0, the training function takes the form $f_b(x_b, H_b)$.

In order to anonymize models after the first, $M_b$>0, the anonymization function $*(\Theta_b)$ fits a distribution to all $\theta_{b-1}$'s that were updated by $f_b$. The update amounts (i.e., the element-wise differences between $\theta_{b-1}$ and $\theta_b$) are considered as additional dimensions in the joint PDF, for a total of 2d dimensions. $*(\Theta_b)$ then samples updates for each $\theta_b$ that was not updated by $f_b$, with the updates being correlated with $\theta_{b-1}$'s weights.

Anonymizing $M_{b>0}$. For executions of $f_b$>0, performing $*(H_b)$ is not necessary. $*(\Theta^*_b)$ is still required in order to anonymize all $\theta$'s that were not updated by $f_b$. For each b, $\Theta^{\wedge}_b$ is the set of $\theta$'s that were updated by $f_b$. Assuming an attacker could have access to all previous batches, $\Theta^*_b$ is $$(\Sigma_i^b nk_i \in_i, \Sigma_i^b nk_i \delta_i)$$

which may be differentially private.

Proof: $*(H_b)$ is not necessary because all hash values have already been filled in; $H_b = H^*_0$. The proof for $*(\Theta^*b)$ follows the same process as the proof for anonymizing $\Theta$, using example 2 for composition as seen in the accounting for k. Observe that n is a product of the hashing process g and does not change between batches, while k and $\in$ are unique to each batch.

In online settings, where the same word may appear in multiple update cycles, the cost of querying the same word needs to be paid each time. Depending on what amount of risk is considered acceptable, and the size of $k_b$, $\in_b$ and $\delta_b$ in each iteration, a upper bound may need to be placed on b. Once the limit is reached, no more updates are allowed without exceeding the accepted risk threshold.

Experiments performed for the present invention, one can measure both the performance of classification models and the corresponding privacy cost $\in$. Further, one can may compare the performance of traditional (non-confidential) and confidential models trained with static "offline" learning.

The documents used in the present invention have been collected by Kira Systems as part of business operations. Overall, experiments involve hundreds of legal documents containing tens of millions of words. Nineteen models are built in both the offline and online scenarios, with each model trained to extract different text segments. For each model, text segments are labelled as either "relevant" or "not relevant"; these are two class labels, with between 0.7% and 0.01% of the corpus being labeled as "relevant". Details for each model are provided in conjunction with table I.

The model f one can use for experiments is a Conditional Random Field trained with the Passive-Aggressive algorithm. One can use a proprietary Go implementation of the model based on the implementation used by the CRF suite software.

To feature the text, Kira Systems uses a purpose-built variation of the punkt algorithm. One can use binary n-grams and skip-grams among other features. One can found stemming, case normalization and part-of-speech tagging did not provide a meaningful performance improvement. For any arbitrary word in x, the maximum number n of features that can be produced by featurization process is n=6. If that word appears k times in x, then using the accounting for k, one can have a per-word $\in$ scaled with $\Box\Box=6k$.

TABLE 1

DETAILS OF THE 20 MODELS TRAINED IN OUR EXPERIMENTS.

| Model ID | Document Count | Word Count (millions, approx.) | Unique Word Count (millions, approx.) | Hash Count (millions, approx.) |
|---|---|---|---|---|
| 1086 | 60 | 8 | 0.053 | 1.165 |
| 1238 | 190 | 20 | 0.108 | 1.601 |
| 1239 | 300 | 24 | 0.135 | 1.790 |
| 1240 | 390 | 30 | 0.140 | 1.805 |
| 1242 | 300 | 24 | 0.134 | 1.790 |
| 1243 | 280 | 19 | 0.120 | 1.738 |
| 1244 | 240 | 18 | 0.118 | 1.707 |
| 1245 | 350 | 28 | 0.140 | 1.827 |
| 1262 | 280 | 20 | 0.120 | 1.740 |
| 1300 | 360 | 28 | 0.150 | 1.862 |
| 1444 | 240 | 20 | 0.071 | 1.545 |
| 1460 | 180 | 15 | 0.083 | 1.501 |
| 1500 | 230 | 14 | 0.098 | 1.601 |
| 1509 | 350 | 20 | 0.122 | 1.777 |
| 1512 | 350 | 20 | 0.122 | 1.777 |
| 1520 | 360 | 21 | 0.128 | 1.793 |
| 1524 | 160 | 9 | 0.061 | 1.366 |
| 1551 | 300 | 24 | 0.124 | 1.754 |
| 1601 | 190 | 17 | 0.084 | 1.458 |
| 1611 | 310 | 25 | 0.142 | 1.846 |
| Average | 273 | 20 | 0.115 | 1.679 |

From the table-I, one can see that most unique words are less than 0.7% of the total words, so one can use that as approximation for k, giving us $\eta\kappa\approx0.042|\Theta|\approx0.042|\Theta^{\wedge}|$.

The hashing strategy g one can use is MurmurHash3. Due to memory constraints one can use a rather small hash range of $R=2^{21}\approx2.097$ million compared to average hash count in the table-I, leading to $\delta=0.5$ on average, which one can reduce to $\delta=0.01$ for all models using in the reducing $\delta$. This is still larger than would be naively acceptable in most settings, however one can note that $\delta$ only represents the risk of at least one collided hash being detected, not of a word being leaked. Upon detecting all the collisions (some of which are synthetic) the attacker would then need to guess words that map to all the collided hashes, and trust that their guess, and not some other word, is what caused the perhaps-genuine collision. When combined with the fact that to even detect a collision, the attacker requires hashing code and training code of the present invention, and every word in the corpus except for one, one can find the practical risk of a leak to be much lower than the worst-case theoretical leak described by $\delta$.

Each hash tuple (h, $\theta$) has two elements in $\theta$, corresponding to one weight value per label. Therefore the dimensionality of the joint PDF for *($\Theta$) is d=2 in the offline case (and for M' in the online case), and d=4 when updating $M_{b>0}$. $\theta$ only contains a weight for labels that f(x) has observed h having. One can find that in practice due to the high label imbalance, in at least 97% of cases if $\theta$ contains a weight for the "relevant" label, it also contains one for the "not relevant" label. Thus the size of $\Theta^{\wedge}$ in the present invention is approximately $0.97c|\Theta|$, where c is the prevalence of the "relevant" label.

One can fit a joint PDF to $\Theta^{\wedge}$ using Kernel Density Estimation (KDE) with a Guassian kernel. Performing KDE is where the most computation time is required to execute functions of the present invention, *(H) and *($\Theta$), however in all experiments it required several orders of magnitude less time than the training process f(x). One can experiment with three kernel bandwidths: w=0.01, w=0.001 and w=0.0001. The bandwidth affects the smoothness of the fit, and controls the impact that each data point makes to the distribution. Increasing the bandwidth therefore decreases the privacy cost, but also decreases the model performance as will be shown below.

Initial testing found that $\in'$ was always smaller than $\eta\kappa\in$, and so one can use adjacency to measure the privacy loss in experiments. Rather than compute the KL-divergence for all possible adjacent x, x' combinations (which would likely require checking every $\Theta^{\wedge'}$ that is $\Box\Box$ distance from $\Theta^{\wedge}$), one can observe that weights are heavily focused around the mean and approximate the maximum KL-divergence by removing the $\Box\Box=0.042|\Theta^{\wedge}|$ hashes with weights furthest from the mean and treating that as x'. Initial experiments confirmed that this gave the largest KL-divergence within one order of magnitude, with all other divergence values being between 100 and 10-12 times smaller.

One can use the F-measure to assess the performance of the models, with the default $\beta=1$, commonly referred to as the F1 score. Using the F1 score is appropriate for use-case due to the high label imbalance.

Offline Learning Results:

TABLE II

| | Traditional | Private Model | | | | | |
|---|---|---|---|---|---|---|---|
| | Model | w = 0.01 | | w = 0.001 | | w = 0.0001 | |
| Model ID | F1 | $\epsilon'$ | F1 | $\epsilon'$ | F1 | $\epsilon'$ | F1 |
| 1086 | 0.933 | 0.000040 | 0.903 | 0.0196 | 0.935 | 0.689 | 0.931 |
| 1238 | 0.949 | 0.000054 | 0.271 | 0.0288 | 0.946 | 0.620 | 0.953 |
| 1239 | 0.866 | 0.000010 | 0.869 | 0.0136 | 0.867 | 0.213 | 0.867 |
| 1240 | 0.964 | 0.000002 | 0.963 | 0.0001 | 0.964 | 0.001 | 0.964 |
| 1242 | 0.928 | 0.000014 | 0.920 | 0.0159 | 0.926 | 0.275 | 0.927 |
| 1243 | 0.767 | 0.000015 | 0.743 | 0.0124 | 0.768 | 0.208 | 0.767 |
| 1244 | 0.688 | 0.000067 | 0.648 | 0.0356 | 0.685 | 0.496 | 0.686 |
| 1245 | 0.873 | 0.000002 | 0.867 | 0.0057 | 0.872 | 0.104 | 0.873 |
| 1262 | 0.841 | 0.000003 | 0.827 | 0.0059 | 0.837 | 0.092 | 0.840 |
| 1300 | 0.893 | 0.000001 | 0.888 | 0.0025 | 0.893 | 0.040 | 0.893 |
| 1444 | 0.875 | 0.000006 | 0.866 | 0.0050 | 0.874 | 0.089 | 0.875 |
| 1460 | 0.818 | 0.000124 | 0.771 | 0.0707 | 0.821 | 1.073 | 0.830 |
| 1500 | 0.933 | 0.000029 | 0.934 | 0.0189 | 0.933 | 0.276 | 0.933 |
| 1509 | 0.868 | 0.000124 | 0.872 | 0.0357 | 0.871 | 0.535 | 0.868 |
| 1512 | 0.878 | 0.000043 | 0.702 | 0.0323 | 0.877 | 0.575 | 0.873 |
| 1520 | 0.931 | 0.001083 | 0.904 | 0.1751 | 0.936 | 2.383 | 0.936 |

TABLE II-continued

| Model ID | Traditional Model F1 | Private Model | | | | | |
|---|---|---|---|---|---|---|---|
| | | w = 0.01 | | w = 0.001 | | w = 0.0001 | |
| | | $\epsilon'$ | F1 | $\epsilon'$ | F1 | $\epsilon'$ | F1 |
| 1524 | 0.866 | 0.000020 | 0.853 | 0.0193 | 0.867 | 0.315 | 0.869 |
| 1551 | 0.865 | 0.000188 | 0.680 | 0.0603 | 0.846 | 1.063 | 0.855 |
| 1601 | 0.978 | 0.000008 | 0.970 | 0.0114 | 0.978 | 0.190 | 0.976 |
| 1611 | 0.983 | 0.000148 | 0.510 | 0.0621 | 0.978 | 1.204 | 0.982 |
| Average | 0.885 | 0.000099 | 0.798 | 0.0315 | 0.884 | 0.522 | 0.885 |

In the present invention, five-fold cross-validation and report the average F1 scores in results of the present invention. The privacy cost $\epsilon'$ is also included. Also provided results for three KDE bandwidth values, w=0.01, w=0.001 and w=0.0001.

Starting broadly, one can see that both privacy costs and F1 scores increase as the bandwidth is reduced. This is expected, given that the smaller the bandwidth, the more emphasis that is placed on each data point and the tighter the PDF fits to the data. This causes the spread of the sampled weights to decrease, meaning that hashes in the test data not appearing in the training data are more likely to have small weights, and therefore be less likely to skew the results.

Looking at the average results in the bottom row of table-II one can see that an increase in the magnitude of the bandwidth results in a decrease in the magnitude of the privacy cost. Interestingly, the average F1 score when w=0.001 is almost exactly equal to the average performance of the traditional models, at 0.884. In fact many of the private models are within 1% of the F1 scores of the corresponding non-private models at the larger w=0.01, highlighted in bold.

Only one model, Model 1551, requires a smaller bandwidth to reach a performance comparable to the traditional model, costing $\epsilon'$=1.063 in privacy. The next highest bolded privacy cost is $\epsilon'$=0.1751, for Model 1520. Comparatively, the smallest bolded privacy cost is for Model 1300, which only costs $\epsilon'$=$10^{-6}$ to reach F1=0.888 compared to F1=0.893 for the non-private model.

Even without further fine-tuning of the bandwidth, when selecting the best-fitting bandwidth from the three presented in table-II (i.e. the results in bold), the average privacy cost is $\epsilon'$=0.077. With Dwork often recommending that the privacy cost remain below 0.1 [8], and state-of-the-art machine learning algorithms going as high as $\epsilon$=1, $\epsilon$=2, 4, 8 or even $\epsilon$=8.6, spending as little as 0.077 is a very strong privacy guarantee.

Online Learning Results:

TABLE III

| Model ID | Number of Batches b | Traditional Model F1 | Private Model | | | | | |
|---|---|---|---|---|---|---|---|---|
| | | | w = 0.01 | | w = 0.001 | | w = 0.0001 | |
| | | | $\Sigma_i^b \epsilon_i'$ | F1 | $\Sigma_i^b \epsilon_i'$ | F1 | $\Sigma_i^b \epsilon_i'$ | F1 |
| 1086 | 6 | 0.891 | 0.0003 | 0.707 | 1.36 | 0.844 | 4.01 | 0.900 |
| 1238 | 19 | 0.890 | 0.0017 | 0.587 | 4.13 | 0.844 | 13.66 | 0.810 |
| 1239 | 30 | 0.747 | 0.0004 | 0.671 | 4.85 | 0.718 | 11.08 | 0.755 |
| 1240 | 39 | 0.847 | 0.0005 | 0.775 | 3.08 | 0.811 | 9.06 | 0.852 |
| 1242 | 30 | 0.772 | 0.0002 | 0.721 | 3.35 | 0.769 | 9.57 | 0.770 |
| 1243 | 18 | 0.586 | 0.0120 | 0.510 | 19.65 | 0.561 | 48.76 | 0.517 |
| 1244 | 24 | 0.636 | 0.0031 | 0.457 | 7.35 | 0.553 | 21.32 | 0376 |
| 1245 | 15 | 0.760 | 0.0001 | 0.700 | 1.61 | 0.757 | 4.53 | 0.739 |
| 1161 | 28 | 0.698 | 0.0001 | 0.647 | 2.12 | 0.705 | 5.59 | 0.688 |
| 1300 | 36 | 0.853 | 0.0001 | 0.798 | 1.26 | 0.843 | 3.50 | 0.850 |
| 1444 | 24 | 0.796 | 0.0001 | 0.729 | 0.34 | 0.768 | 6.64 | 0.802 |
| 1460 | 18 | 0.695 | 0.0022 | 0.559 | 10.74 | 0.676 | 24.39 | 0.674 |
| 1500 | 13 | 0.814 | 0.0009 | 0.755 | 5.58 | 0.819 | 14.80 | 0.786 |
| 1509 | 35 | 0.823 | 0.0087 | 0.687 | 16.22 | 0.787 | 43.44 | 0.788 |
| 1512 | 35 | 0.700 | 0.0017 | 0.532 | 8.01 | 0.680 | 22.97 | 0.692 |
| 1520 | 16 | 0.883 | 0.0220 | 0.720 | 28.61 | 0.815 | 91.34 | 0.832 |
| 1524 | 16 | 0.744 | 0.0004 | 0.647 | 2.16 | 0.756 | 6.13 | 0.770 |
| 1551 | 30 | 0.548 | 0.0059 | 0.445 | 12.88 | 0.526 | 39.29 | 0.573 |
| 1601 | 19 | 0.895 | 0.0001 | 0.819 | 1.52 | 0.887 | 4.33 | 0.898 |
| 1611 | 31 | 0.929 | 0.0071 | 0.635 | 18.64 | 0,869 | 47.87 | 0.935 |
| Average | 27 | 0.773 | 0.0036 | 0.655 | 7.67 | 0.750 | 21.62 | 0.757 |

Table-III, provides the F1 scores for models built using private online learning solution. For batch b, performance is measured on the next batch, b+1. F1 scores are averaged across all batches. Results for the same bandwidths as table-II are presented, along with the privacy costs $\epsilon'$. The F1 scores within 0.03 of the non-private scores with the lowest privacy costs are bolded.

For private online learning, one can see a small but noticeable drop in average F1 performance; from 0.773 to 0.750 for the middle bandwidth of w=0.001. The drop in performance is expected given the much smaller training set size of each $x_b$ compared to the whole x, making it more likely that hashes within the true distribution did not get sampled by $x_b$, and so were given synthetic $\theta$'s.

As expected, having to compose the privacy cost of multiple batches means that privacy costs are higher across the board. Interestingly, the composed privacy costs are only mildly correlated to the number of batches b, with a Pearson's correlation coefficient of r=0.34. This indicates that the shape and fit of the multivariate PDF for each batch still plays an important role, and can vary between batches.

Unlike in the offline case, no private online models have an F1 score within 0.03 of the non-private version when the bandwidth is w=0.01. For four models—1238, 1244, 1509 and 1520—performance drops by more than 0.03 even when w=0.0001. However some models still perform quite well. For example when w=0.001, Model 1444 manages to only cost $\epsilon'$=0.34 after 24 batches, with performance dropping from 0.796 to 0.768. For a cost of $\epsilon'$=2.16, Model 1524 actually improves in performance by over 1%. On average, the private models with F1 scores within 0.03 of the non-private models cost $\epsilon'$=8.438. This is comparable to those reported by other works, such as ($\epsilon$=8.6) and ($\epsilon$=2, 4, 8).

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The invention claimed is:

1. A method of creating word-level differential privacy with the hashing trick to protect confidentiality of a textual data, the method comprising:
   receiving, by a differential privacy creating device, a list of a plurality of hashes with a weight (or weights) associated with each of the plurality of hashes;
   updating, by said differential privacy creating device, said list with new hashes that are within the range of allowable hash values but not included in said received list of hashes;
   updating, by said differential privacy creating device, said list with a new weight to each of said plurality of hashes that are missing said weight, wherein in cases where said received list of hashes is a newer version of a previously-existing list of hashes, updating said list with adjusted weights with respect to said hashes weights in said previously-existing list of hashes;
   fitting, by said differential privacy creating device, a probability distribution to said list of said weights of said plurality of hashes; and
   generating, by said differential privacy creating device, said new weights and said adjusted weights based on sampling of said probability distribution.

2. The method as claimed in claim 1, wherein a corpus of textual data is converted to said plurality of hashes.

3. The method as claimed in claim 1, wherein said probability distribution is continuous when said weight of said plurality of hashes are continuous, and wherein said probability distribution is discrete value when said weight of said plurality of hashes are discrete values.

4. The method as claimed in claim 1, wherein said probability distribution is multi-dimensional when number of types of said weights is more than one.

5. The method as claim in claim 4, wherein said probability distribution is 2d dimensional when type of said weight is d dimensional and previously-existing weights are being adjusted.

6. A non-transitory computer-readable medium storing computer-executable instructions for generating strategy and roadmap for end-to-end information technology (IT) infrastructure cloud implementation, the computer-executable instructions configured for:
   receiving a list of a plurality of hashes with a weight (or weights) associated with each of the plurality of hashes;
   updating said list with new hashes that are within the range of allowable hash values but not included in said received list of hashes;
   updating said list with a new weight to each of said plurality of hashes that are missing said weight, wherein in cases where said received list of hashes is a newer version of a previously-existing list of hashes, updating said list with adjusted weights with respect to said hashes weights in said previously-existing list of hashes;
   fitting a probability distribution to said list of said weights of said plurality of hashes; and
   generating said new weights and said adjusted weights based on sampling of said probability distribution.

7. The non-transitory computer-readable medium as claimed in claim 6, wherein said probability distribution is continuous when said weight of said plurality of hashes are continuous, and wherein said probability distribution is discrete value when said weight of said plurality of hashes are discrete values.

8. The non-transitory computer-readable medium as claimed in claim 6, wherein said probability distribution is multi-dimensional when the number of types of said weights is more than one.

9. The non-transitory computer-readable medium as claimed in claim 6, wherein said probability distribution is 2d dimensional when type of said weight is d dimensional and previously-existing weights are being adjusted.

* * * * *